US012545776B2

(12) United States Patent
Izzi et al.

(10) Patent No.: US 12,545,776 B2
(45) Date of Patent: Feb. 10, 2026

(54) PEELABLE COMPOSITION

(71) Applicant: Basell Poliolefine Italia S.r.l., Milan (IT)

(72) Inventors: Marco Izzi, Ferrara (IT); Gianluca Musacchi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 493 days.

(21) Appl. No.: 18/037,224

(22) PCT Filed: Nov. 3, 2021

(86) PCT No.: PCT/EP2021/080481
§ 371 (c)(1),
(2) Date: May 16, 2023

(87) PCT Pub. No.: WO2022/106201
PCT Pub. Date: May 27, 2022

(65) Prior Publication Data

US 2024/0002646 A1 Jan. 4, 2024

(30) Foreign Application Priority Data

Nov. 17, 2020 (EP) .................................... 20208010

(51) Int. Cl.
*C08L 23/14* (2006.01)
*C08J 5/18* (2006.01)

(52) U.S. Cl.
CPC ................ *C08L 23/14* (2013.01); *C08J 5/18* (2013.01); *C08J 2323/14* (2013.01); *C08J 2423/06* (2013.01); *C08J 2423/20* (2013.01); *C08L 2203/162* (2013.01); *C08L 2205/025* (2013.01); *C08L 2205/03* (2013.01)

(58) Field of Classification Search
CPC ............... C08L 23/14; C08L 2203/162; C08L 2205/025; C08L 2205/03; C08L 23/06; C08L 23/08; C08L 23/20; C08J 5/18; C08J 2323/14; C08J 2423/06; C08J 2423/20
See application file for complete search history.

(56) References Cited

U.S. PATENT DOCUMENTS

2012/0171405 A1* 7/2012 Pasquali ................. B32B 27/32 525/240
2013/0202836 A1* 8/2013 Musacchi .................. C09J 7/38 525/185
2018/0134858 A1* 5/2018 Bilgen .................... B32B 27/36

FOREIGN PATENT DOCUMENTS

WO 2011064119 A1 6/2011
WO 2011064131 A1 6/2011
WO 2015061440 A1 4/2015
WO 2015178927 A1 11/2015
WO 2018211107 A1 11/2018

OTHER PUBLICATIONS

The International Search Report and The Written Opinion for PCT/EP2021/080481 mailed Jan. 27, 2022.

* cited by examiner

*Primary Examiner* — Alicia Bland

(57) ABSTRACT

A 1-butene copolymer composition made from or containing:

A) from 75.0 wt % to 95.0 wt % of a polymer composition (A) made from or containing A1) from 56 wt % to 77 wt % of a propylene ethylene copolymer;

A2) from 15 wt % to 32 wt % of a low density polyethylene; and

A3) from 4 wt % to 17 wt % of a 1-butene homopolymer, wherein the sum of the amounts of A1, A2, and A3 being 100 wt %; and B) from 5.0 wt % to 25.0 wt % of a copolymer of 1-butene and ethylene containing from 2.8 wt % to 4.2 wt % of ethylene derived units, based upon the total weight of the copolymer of 1-butene and ethylene, wherein the sum of the amounts of A) and B) being 100 wt %.

15 Claims, No Drawings

PEELABLE COMPOSITION

This application is the U.S. National Phase of PCT International Application PCT/EP2021/080481, filed Nov. 3, 2021, claiming benefit of priority to European Patent Application No. 20208010.7, filed Nov. 17, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a composition of polybutene polymers.

BACKGROUND OF THE INVENTION

In some instances, heat-sealable and easy-opening films are used for temporarily closing containers. In some instances, the containers are for food products. During use, a consumer tears away the peelable film.

During some sealing processes, a backing or web layer of the heat-sealable film comes into direct contact with a heated surface such as a sealing jaw. Heat is transferred through the backing layer of the film, thereby melting and fusing an inner sealant layer and accordingly forming a seal. In some instances, the backing layer has a higher melting temperature than the inner sealant layer, thereby preventing the backing layer from melting and sticking to the heated surface.

It is believed that the heat seal initiation temperature relates to packaging line speeds and that a broad sealing window accommodates variability in process conditions, such as pressure and temperature. It is further believed that a broad sealing window enables high speed packaging of heat sensitive products and allows for changes in packaging or filling speeds.

It is believed that the pealing force at room temperature is related to how freely a consumer can peal the film manually.

SUMMARY OF INVENTION

In a general embodiment, the present disclosure provides a 1-butene copolymer composition made from or containing:

A) from 75.0 wt % to 95.0 wt % of a polymer composition (A) made from or containing A1) from 56 wt % to 77 wt % of a propylene ethylene copolymer having:

i) a Melt Flow Rate measured according to ISO 1133-1 (230° C., 2.16 Kg) ranging from 5.1 to 10.0 g/10 min;

ii) a density measured according to ISO 1183-1 ranging from 0.85 g/cm$^3$ to 0.96 g/cm$^3$;

iii) a flexural modulus measured according to ISO 178 ranging from 350 MPa to 550 MPa; and iv) ethylene derived units content ranging from 4.5 wt % to 7.2 wt %, based upon the total weight of the propylene ethylene copolymer;

A2) from 15 wt % to 32 wt % of a low density polyethylene having:

i) a Melt Flow Rate measured according to ISO 1133-1 (190° C., 2.16 Kg) ranging from to 8.0 g/10 min;

ii) a density measured according to ISO 1183-1 ranging from 0.915 g/cm$^3$ to 0.938 g/cm$^3$; and iii) a tensile modulus measured according to ISO 527-2 ranging from 210 MPa to 430 MPa; and A3) from 4 wt % to 17 wt % of a 1-butene homopolymer having:

i) a Melt Flow Rate measured according to ISO 1133-1 (190° C., 2.16 Kg) ranging from to 2.0 g/10 min;

ii) a density measured according to ISO 1183-1 ranging from 0.905 g/cm$^3$ to 0.927 g/cm$^3$; and iii) a flexural modulus measured according to ISO 178 ranging from 320 MPa to 580 MPa;

wherein the sum of the amounts of A1, A2, and A3 being 100 wt %; and

B) from 5.0 wt % to 25.0 wt % of a copolymer of 1-butene and ethylene i) containing from 2.8 wt % to 4.2 wt % of ethylene derived units, based upon the total weight of the copolymer of 1-butene and ethylene;

ii) having a Melt Flow Rate measured according to ISO 1133-1-(190° C., 2.16 Kg) ranging from 1.0 to 5.5 g/10 min;

iii) having a flexural modulus measured according to ISO 178 ranging from 50 MPa to 250 MPa; and iv) having a melting temperature measured according to ISO 11357-3 ranging from 83° C. and 108° C., wherein the sum of the amounts of A) and B) being 100 wt %.

DETAILED DESCRIPTION OF THE INVENTION

In some embodiments, the present disclosure is a 1-butene copolymer composition made from or containing:

A) from 75.0 wt % to 95.0 wt %; alternatively from 80.2 wt % to 90.4 wt %; alternatively from 83.0 wt % to 87.7 wt %; of a polymer composition (A) made from or containing A1) from 56 wt % to 77 wt %; alternatively from 60 wt % to 73 wt %; alternatively from 63 wt % to 70 wt %; of a propylene ethylene copolymer having:

i) a Melt Flow Rate measured according to ISO 1133-1-(230° C., 2.16 Kg) ranging from to 10.0 g/10 min; alternatively ranging from 5.8 to 8.5 g/10 min;

ii) a density measured according to ISO 1183-1 ranging from 0.85 g/cm$^3$ to 0.96 g/cm$^3$; alternatively ranging from 0.87 g/cm$^3$ to 0.93 g/cm$^3$;

iii) a flexural modulus measured according to ISO 178 ranging from 350 MPa to 550 MPa; alternatively ranging from 400 MPa to 400 MPa; and iv) ethylene derived units content ranging from 4.5 wt % to 7.2 wt %; alternatively from 4.8 wt % to 7.0 wt %; alternatively from 5.5 wt % to 6.7 wt %, based upon the total weight of the propylene ethylene copolymer;

A2) from 15 wt % to 32 wt %; alternatively from 18 wt % to 28 wt %; alternatively from 20 wt % to 15 wt %; of a low density polyethylene having:

i) a Melt Flow Rate measured according to ISO 1133-1 (190° C., 2.16 Kg) ranging from to 8.0 g/10 min; alternatively ranging from 1.0 to 5.0 g/10 min; alternatively ranging from 1.2 to 3.5 g/10 min;

ii) a density measured according to ISO 1183-1 ranging from 0.915 g/cm$^3$ to 0.938 g/cm$^3$; alternatively ranging from 0.921 g/cm$^3$ to 0.933 g/cm$^3$; alternatively ranging from 0.924 g/cm$^3$ to g/cm$^3$; and iii) a tensile modulus measured according to ISO 527-1, -2 ranging from 210 MPa to 430 MPa; alternatively ranging from 230 MPa to 400 MPa; alternatively ranging from 250 MPa to 350 MPa; and A3) from 4 wt % to 17 wt %; alternatively from 6 wt % to 14 wt %; alternatively from 8 wt % to 12 wt %; of a 1-butene homopolymer having:

i) a Melt Flow Rate measured according to ISO 1133-1 (190° C., 2.16 Kg) ranging from to 2.0 g/10 min; alternatively ranging from 0.2 to 1.0 g/10 min; alternatively ranging from 0.2 to g/10 min;

ii) a density measured according to ISO 1183-1 ranging from 0.905 g/cm$^3$ to 0.927 g/cm$^3$; alternatively ranging from 0.908 g/cm$^3$ to 0.922 g/cm$^3$; alternatively ranging from 0.910 g/cm$^3$ to g/cm$^3$; and iii) a flexural modulus measured according to ISO 178 ranging from 320 MPa to 580 MPa; alternatively ranging from 380 MPa to 520 MPa; alternatively ranging from 400 MPa to 500 MPa;

wherein the sum of the amounts of A1, A2, and A3 being 100 wt %; and

B) from 5.0 wt % to 25.0 wt %; alternatively from 9.6 wt % to 19.8 wt %; alternatively from 12.3 wt % to 17.0 wt %; of a copolymer of 1-butene and ethylene i) containing from 2.8 wt % to 4.2 wt %; alternatively from 3.0 wt % to 4.0 wt %; alternatively from 3.2 wt % to 3.9 wt %; of ethylene derived units, based upon the total weight of the copolymer of 1-butene and ethylene;

ii) having a Melt Flow Rate measured according to ISO 1133-1-(190° C., 2.16 Kg) ranging from 1.0 to 5.5 g/10 min; alternatively from 2.1 to 4.8 g/10 min; alternatively from 2.6 to 4.1 g/10 min;

iii) having a flexural modulus measured according to ISO 178 ranging from 50 MPa to 250 MPa; alternatively ranging from 90 MPa to 210 MPa; alternatively ranging from 95 MPa, to 174 MPa; and iv) having a melting temperature measured according to ISO 11357-3 ranging from 83° C. and 108° C., alternatively ranging from 84° C. and 103° C.; alternatively ranging from 99° C. and 100° C., wherein the sum of the amounts of A) and B) being 100 wt %.

As used herein, the term “copolymer” refers to polymers containing two comonomers such as propylene and ethylene or 1-butene and ethylene.

In some embodiments, component A) has the following features:

i) a Melt Flow Rate: measured according to ISO 1133-1 (230° C., 2.16 Kg) ranging from 2.0 to 12 g/10 min; alternatively ranging from 4.0 to 10.0 g/10 min; and ii) a density measured according to ISO 1183-1 ranging from 0.890 g/cm$^3$ to 0.920 g/cm$^3$; alternatively ranging from 0.895 g/cm$^3$ to 0.9120 g/cm$^3$; alternatively ranging from 0.898 g/cm$^3$ to 0.908 g/cm$^3$.

In some embodiments, component A) contains from 0.5 wt % to 2.0 wt %; alternatively from 0.7 wt % to 1.5 wt %; of a masterbatch such as Premix Antiblocking PP45.

In some embodiments, the 1-butene copolymer composition is used for the preparation of films, alternatively multilayer films, having a sealing layer is made from or containing the 1-butene copolymer composition.

In some embodiments, the present disclosure provides a film made from or containing the 1-butene copolymer composition. In some embodiments, the present disclosure provides a multilayer film, having a sealing layer made from or containing the 1-butene copolymer composition.

In some embodiments, the multilayer films have at least the sealing layer made from or containing the 1-butene copolymer composition. In some embodiments, the remaining layers are made from or containing other materials for use in multilayer films or in laminated products. In some embodiments, each layer is made from or containing a polymer selected from the group consisting of polypropylene homopolymers, propylene copolymers, polyethylene homopolymers, polyethylene copolymers, and ethylene-vinyl acetate polymers.

In some embodiments, the combination and number of the layers of the multilayer structure is not limited. In some embodiments, the number is from 3 to 11 layers, alternatively 3 to 9 layers, alternatively 3 to 7 layers, alternatively 3 to 5 layers. In some embodiments, the combinations are selected from the group consisting of CB/A, C/B/C/B/A, and C/B/C/D/C/B/A, wherein sealing layer A is made from or containing the 1-butene copolymer composition.

In some embodiments, the layers of the multilayer film are 3 or 5, wherein the sealing layer is made from or containing, alternatively consists essentially of, the 1-butene copolymer composition. As used herein, the term “consists essentially of” refers to and permits the presence of further components, which do not materially affect the essential characteristics of the compound or composition. In some embodiments, no further polymers are present in the composition.

In some embodiments, the 1-butene copolymer composition is prepared by mechanically blending component A) and component B).

In some embodiments, component A) and component B) are commercially available.

In some embodiments, component A1) is commercially available under the tradename Clyrell RC112L from LyondellBasell;

In some embodiments, component A2) is commercially available under the tradename Lupolen, 3020H from LyondellBasell;

In some embodiments, component A3) is commercially available under the tradename PB 0110M from LyondellBasell;

In some embodiments, component B) is a 1-butene ethylene copolymer commercially available under the tradename Koattro DP 8310M from LyondellBasell.

In some embodiments, the 1-butene copolymer composition is further made from or containing additives.

The following examples are given to illustrate but not limit the present disclosure.

EXAMPLES

Melt Flow Rate measured according to ISO 1133-1 (230° C., 2.16 Kg or 190° C., 2.16 Kg).

Tensile Modulus was measured according to ISO 527-2, and ISO 1873-2 on injection-molded sample.

Density was measured according to ISO 1183-1.

The density of samples was measured according to ISO 1183-1 (ISO 1183-1 method A “Methods for determining the density of non-cellular plastics—Part 1: Immersion method, liquid pyknometer method and titration method”; Method A: Immersion method, for solid plastics (except for powders) in void-free form). Test specimens were taken from compression-molded plaques conditioned for 110 days before carrying out the density measure.

Flexural Modulus according to ISO 178, and supplemental conditions according to ISO 1873-2.

Melting temperature was measured according to ISO 11357-3.

Determination of ethylene (C2) content by NMR in a propylene ethylene copolymer $^{13}$C NMR spectra were acquired on a Bruker AV-600 spectrometer equipped with cryoprobe, operating at 160.91

MHz in the Fourier transform mode at 120° C. The ethylene (C2) content was measured on the total composition. The ethylene content of component B) was calculated by using the amount of component B) according to the following equation:

$$C_{2tot}=C_{2B}X\text{wt \% compB}/100.$$

The peak of the Sββ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as an internal standard at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD, thereby removing $^{1}$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with 6-titanium trichloride-diethylaluminum chloride" M. Kakugo, Y. Naito, K. Mizunuma and T. Miyatake, Macromolecules, 1982, 15, 1150) using the following equations:

$$PPP=100T\beta\beta/S \quad PPE=100T\beta\delta/S \quad EPE=100T\delta\delta/S$$

$$PEP=100S\beta\beta/S \quad PEE=100S\beta\delta/S \quad EEE=100(0.25S\gamma\delta+0.5S\delta\delta)/S$$

$$S=T\beta\beta+T\beta\delta+T\delta\delta+S\beta\beta+S\beta\delta+0.25S\gamma\delta+0.5S\delta\delta$$

The molar percentage of ethylene content was evaluated using the following equation:

$$E\%\ \text{mol}=100*[PEP+PEE+EEE]$$

The weight percentage of ethylene content was evaluated using the following equation:

$$E\%\ \text{mol}*MWE$$

$$E\%\ \text{wt.}=E\ \%\ \text{mol}*MWE+P\%\ \text{mol}*MWP$$

where P % mol is the molar percentage of propylene content, while MWE and MWP are the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1r_2 = 1 + \left(\frac{EEE+PEE}{PEP} - +1\right) - \left(\frac{P}{E}+1\right)\left(\frac{EEE+PEE}{PEP}+1\right)^{0.5}$$

The tacticity of Propylene sequences was calculated as mm content from the ratio of the PPP mm$T_{\beta\beta}$ (28.90-29.65 ppm) and the whole $T_{\beta\beta}$ (29.80-28.37 ppm).

The ethylene content of component B) was calculated from the total ethylene content by using the following equation:

$$E\%\ \text{wt total}=E\%\ \text{wt}/B*\text{wt}\ \%B$$

wherein E % wt total was the total ethylene content, E % wt/B was the ethylene content of component B), and wt % B was the amount (wt %/100) of component B).

Ethylene Content in a 1-Butene Ethylene Copolymer

The content of comonomers was determined by infrared spectroscopy by collecting the IR spectrum of the sample vs. an air background with a Fourier Transform Infrared spectrometer (FTIR). The instrument data acquisition parameters were:

purge time: 30 seconds minimum
collect time: 3 minutes minimum
apodization: Happ-Genzel
resolution: 2 cm$^{-1}$.

Sample Preparation—Using a hydraulic press, a thick sheet was obtained by compression molding about 1 gram of sample between two aluminum foils. A small portion was cut from this sheet to mold a film. The film thickness was set to have a maximum absorbance of the $CH_2$ absorption band recorded at ~720 cm$^{-1}$ of 1.3 a.u. (% Transmittance>5%). Molding conditions were a temperature of 180±10° C. (356° F.) with a pressure around 10 kg/cm$^2$ (142.2 PSI) for about one minute. The pressure was then released. The sample was removed from the press and cooled to room temperature. The spectrum of pressed film sample was recorded in absorbance vs. wavenumbers (cm$^{-1}$). The following measurements were used to calculate ethylene (C2) and 1-butene (C4) contents:

a) Area ($A_t$) of the combination absorption bands between 4482 and 3950 cm$^{-1}$ which was used for spectrometric normalization of film thickness.
b) Area ($A_{C2}$) of the absorption band due to methylenic sequences ($CH_2$ rocking vibration) in the range 660 to 790 cm$^{-1}$ after a proper digital subtraction of an isotactic polypropylene (IPP) and a $C_2C_4$ standard spectra.
c) The factor of subtraction ($FCR_{C4}$) between the spectrum of the polymer sample and the $C_2C_4$ standard spectrum. The standard spectrum was obtained by digital subtraction of a linear polyethylene from a $C_2C_4$ copolymer, thereby extracting the $C_4$ band (ethyl group at ~771 cm$^{-1}$).

The ratio $A_{C2}/A_t$ was calibrated by analyzing standard ethylene-1-butene copolymer compositions, determined by NMR spectroscopy. To calculate the ethylene ($C_2$) and 1-butene ($C_4$) content, calibration curves were obtained by using standard samples of ethylene and 1-butene detected by $^{13}$C-NMR.

Calibration for ethylene—A calibration curve was obtained by plotting $A_{C2}/A_t$ versus ethylene molar percent (% C2m), and the coefficient $a_{C2}$, $b_{C2}$ and $c_{C2}$ were calculated from a "linear regression".

Calibration for 1-butene—A calibration curve was obtained by plotting $FCR_{C4}/A_t$ versus butane molar percent (% $C_4$m), and the coefficients $a_{C4}$, $b_{C4}$ and $C_{C4}$ were calculated from a "linear regression".

The spectra of the samples were recorded. The values for ($A_t$), ($A_{C2}$) and ($FCR_{C4}$) of the samples were calculated.

The ethylene content (% molar fraction C2m) of the sample was calculated as follows:

$$\%\ C2m = -b_{C2} + \frac{\sqrt{b_{C2}^2 - 4\cdot a_{C2}\cdot\left(c_{C2} - \frac{A_{C2}}{A_t}\right)}}{2\cdot a_{C2}}$$

The 1-butene content (% molar fraction C4m) of the sample was calculated as follows:

$$\%\ C4m = -b_{C4} + \frac{\sqrt{b_{C4}^2 - 4\cdot a_{C4}\cdot\left(c_{C4} - \frac{A_{C4}}{A_t}\right)}}{2\cdot a_{C4}}$$

$a_{C4}$, $b_{C4}$, $c_{C4}$ $a_{C2}$, $b_{C2}$, $c_{C2}$ were the coefficients of the two calibrations.

Changes from mol % to wt % were calculated by using molecular weights.

Components A and B

Component A was made from or containing 66.9 wt % of Clyrell RC 112L a random propylene ethylene copolymer; 22 wt % of Lupolen 3020H a linear low density polyethylene; 10 wt % of PB 0110M a 1-butene homopolymer, 1 wt % masterbatch, and 0.1 wt % standard additives. The polymers were commercially available from LyondellBasell.

Component B was a 1-butene ethylene copolymer commercially available under the tradename Koattro DP 8310M from LyondellBasell.

The features of components A are reported on Table 1.

TABLE 1

| | | A1 | A2 | A3 |
|---|---|---|---|---|
| MFR 230° C. 2.16 kg | g/10 min | 7.0 | — | — |
| MFR 190° C. 2.16 kg | g/10 min | — | 2.0 | 0.4 |
| Density | g/cm$^3$ | 0.90 | 0.928 | 0.914 |
| Flexural modulus | MPa | 450 | — | 450 |
| Ethylene content | Wt % | 6.1 | — | — |
| Tensile modulus | MPa | — | 300 | — |

The features of components A and B are reported on Table 2.

TABLE 2

| | | Component A | Component B |
|---|---|---|---|
| MFR 230° C. 2.16 kg | g/10 min | 6.0 | — |
| MFR 190° C. 2.16 kg | g/10 min | — | 3.5 |
| Density | g/cm$^3$ | 0.902 | — |
| Flexural modulus | MPa | — | 120 |
| Tm | ° C. | — | 94 |
| Ethylene content | Wt % | — | 3.7 |

Example 1

Component A was blended with component B (85 wt % A; 15 wt % B), and a 35 micron cast film was obtained. The cast film was sealed at different sealing temperature on the cast film itself. For each sealing temperature, the peeling force was measured.

Comparative Example 2

In comparative example 2, the blend of 85 wt % of A and 15 wt % of B was replaced with 100 wt % of A.

Table 3 shows the peeling forces at various sealing temperatures.

TABLE 3

| Sealing temp ° C. | Max force N | Example 1 Failure mode | Max force N | Comparative Ex 2 Failure mode |
|---|---|---|---|---|
| 130 | 5.1 | peel | 4.1 | peel |
| 140 | 8.2 | elongation & break | 5.6 | elongation & peel |
| 150 | 8.1 | elongation & break | 5.7 | elongation & peel |
| 160 | 8.3 | elongation & break | 8.5 | elongation & break |
| 180 | 8.0 | elongation & break | 8.9 | elongation & break |

The invention claimed is:

1. A 1-butene copolymer composition comprising:

A) from 75.0 wt % to 95.0 wt % of a polymer composition (A) comprising:

A1) from 56 wt % to 77 wt % of a propylene ethylene copolymer having:

i) a Melt Flow Rate: measured according to ISO 1133-1-(230° C., 2.16 Kg) ranging from 5.1 to 10.0 g/10 min;

ii) a density measured according to ISO 1183-1 ranging from 0.85 g/cm$^3$ to 0.96 g/cm$^3$;

iii) a flexural modulus measured according to ISO 178 ranging from 350 MPa to 550 MPa; and iv) ethylene derived units content ranging from 4.5 wt % to 7.2 wt %, based upon the total weight of the propylene ethylene copolymer;

A2) from 15 wt % to 32 wt % of a low density polyethylene having:

i) a Melt Flow Rate: measured according to ISO 1133-1 (190° C., 2.16 Kg) ranging from 0.33 to 8.0 g/10 min;

ii) a density measured according to ISO 1183-1 ranging from 0.915 g/cm$^3$ to 0.938 g/cm$^3$; and iii) a tensile modulus measured according to ISO 527-2 ranging from 210 MPa to 430 MPa; and A3) from 4 wt % to 17 wt % of a 1-butene homopolymer having:

i) a Melt Flow Rate: measured according to ISO 1133-1 (190° C., 2.16 Kg) ranging from 0.1 to 2.0 g/10 min;

ii) a density measured according to ISO 1183-1 ranging from 0.905 g/cm$^3$ to 0.927 g/cm$^3$; and iii) a flexural modulus measured according to ISO 178 ranging from 320 MPa to 580 MPa;

wherein the sum of the amounts of A1, A2 and A3 being 100 wt %; and

B) from 5.0 wt % to 25.0 wt % of a copolymer of 1-butene and ethylene i) containing from 2.8 wt % to 4.2 wt % of ethylene derived units, based upon the total weight of the copolymer of 1-butene and ethylene;

ii) having a Melt Flow Rate: measured according to ISO 1133-1-(190° C., 2.16 Kg) ranging from 1.0 to 5.5 g/10 min;

iii) having a flexural modulus measured according to ISO 178 ranging from 50 MPa to 250 MPa; and iv) having a melting temperature measured according to ISO 11357-3 ranging from 83° C. and 108° C., wherein the sum of the amounts of A) and B) being 100 wt %.

2. The 1-butene copolymer polymer composition according to claim 1, wherein component A ranges from 80.2 wt % to 90.4 wt % and component B) ranges from 9.6 wt % to 19.8 wt %.

3. The 1-butene copolymer polymer composition according to claim 1, wherein:

component A1 ranges from 60 wt % to 73 wt %;

component A2 ranges from 18 wt % to 28 wt %; and component A3 range from 6 wt % to 14 wt %.

4. The 1-butene copolymer polymer composition according to claim 1, wherein the 1-butene ethylene copolymer component B) contains from 3.2 wt % to 3.9 wt % of ethylene derived units, based upon the total weight of the copolymer of 1-butene and ethylene.

5. The 1-butene copolymer polymer composition according to claim 1, wherein, in component B), the Melt Flow Rate: measured according to ISO 1133-1-(190° C., 2.16 Kg) ranges from 2.1 to 4.8 g/10 min.

6. The 1-butene copolymer polymer composition according to claim 1, wherein, in component B), the melting temperature measured according to ISO 11357-3 ranges from 84° C. and 103° C.

7. The 1-butene copolymer polymer composition according to claim 1, wherein component A) has a Melt Flow Rate: measured according to ISO 1133-1 (230° C., 2.16 Kg) ranging from 2.0 to 12 g/10 min.

8. The 1-butene copolymer polymer composition according to claim 1, wherein component A) has a density measured according to ISO 1183-1 ranging from 0.890 $g/cm^3$ to 0.920 $g/cm^3$.

9. The 1-butene copolymer polymer composition according to claim 1, wherein component A1) has ethylene derived units content ranging from 4.8 wt % to 7.0 wt %, based upon the total weight of the propylene ethylene copolymer.

10. The 1-butene copolymer polymer composition according to claim 1, wherein component A2) has a density measured according to ISO 1183-1 ranging from ranging from 0.921 $g/cm^3$ to 0.933 $g/cm^3$.

11. The 1-butene copolymer polymer composition according to claim 1, wherein component A3) has a density measured according to ISO 1183-1 ranging from 0.908 $g/cm^3$ to 0.922 $g/cm^3$.

12. The 1-butene copolymer polymer composition according to claim 1, wherein component A1) has a density measured according to ISO 1183-1 ranging from 0.87 $g/cm^3$ to 0.93 $g/cm^3$.

13. The 1-butene copolymer polymer composition according to claim 1, wherein component A3) has a Melt Flow Rate measured according to ISO 1133-1 (190° C., 2.16 Kg) ranging from 0.2 to 1.0 g/10 min.

14. A film comprising the 1-butene copolymer polymer composition of claim 1.

15. A film according to claim 14, wherein the film is a multilayer film.

* * * * *